(No Model.)

D. G. RICHARDS.
WINDOW CLEARING APPARATUS.

No. 387,919. Patented Aug. 14, 1888.

WITNESSES
P. S. Lowrie.
Geo. W. King.

INVENTOR
David G. Richards
By Liggett & Liggett,
Attorneys.

N. PETERS, Photo-Lithographer, Washington, D. C.

United States Patent Office.

DAVID G. RICHARDS, OF CLEVELAND, OHIO.

WINDOW-CLEARING APPARATUS.

SPECIFICATION forming part of Letters Patent No. 387,919, dated August 14, 1888.

Application filed January 30, 1888. Serial No. 262,332. (No model.)

*To all whom it may concern:*

Be it known that I, DAVID G. RICHARDS, of Cleveland, in the county of Cuyahoga and State of Ohio, have invented certain new and useful Improvements in Window-Clearing Apparatus; and I do hereby declare the following to be a full, clear, and exact description of the invention, such as will enable others skilled in the art to which it pertains to make and use the same.

My invention relates to improvements in window-clearing apparatus, designed more especially for clearing the engineer's lookout-window on the cab of a locomotive-engine; and it consists in certain features of construction, and in combination of parts, hereinafter described, and pointed out in the claims.

Figure 1:
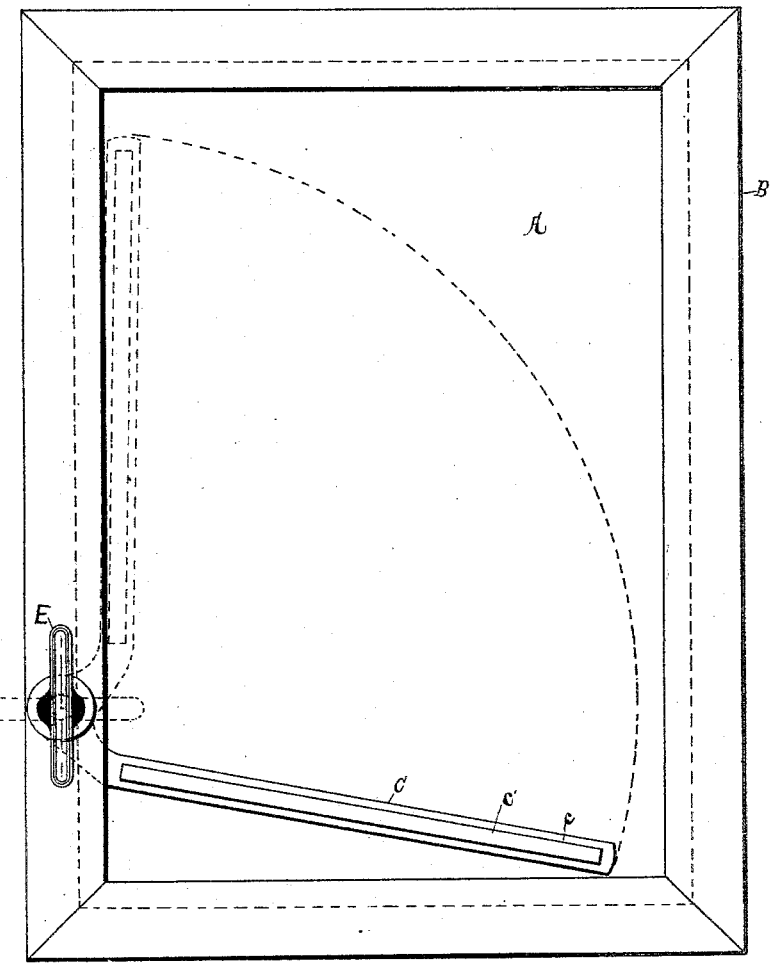
Figure 2:
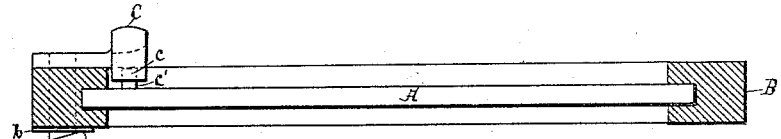
Figure 3:
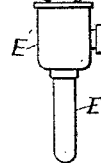

In the accompanying drawings, Figure 1 is a side elevation, seen from the inside of the window. Fig. 2 is a plan, partly in section. Fig. 3 is a plan in detail, showing the handle of the device.

A represents a pane of window-glass, and B the sash or window-frame.

C is an arm mounted on spindle D, the latter extending through and being journaled in frame B, the spindle being located, preferably, about as shown, on the one side of the window, which, together with the length of arm C, causes the arm when turned by the spindle to sweep across the central portion of the window-pane. Arm C, on the side thereof next the glass, has a longitudinal recess, c, for holding a strip or pad, c', of rubber or other soft material, suitable for clearing the window-pane. On the inside of the window spindle D is provided with a handle, E, for operating the spindle and arm, the handle being secured to the spindle by means of set-screw e. Between the hub E' of the handle and frame B is located a spring, F, the latter being coiled around the spindle. The tension of the spring tends to draw the spindle lengthwise and inward, and thus causes arm E to press pad e' against the window-pane. By adjusting handle E lengthwise of the spindle more or less tension may be given to the spring. A washer, b, is mounted on the spindle next inside of casing B to receive the thrust of the spring; otherwise the wood would soon be worn away by engaging the spring.

On locomotive-engines it is important that the engineers have always a clear view of the track, and this is often rendered difficult by reason of snow, rain, sleet, or moisture accumulating on the outside of the lookout-window pane. With my improved apparatus attached, the engineer has only to grasp handle E from time to time and give the handle a turn to cause arm C to sweep across and clear the window, which operation may be done in a moment. The device is simple and inexpensive, and will be found well adapted for such purpose.

What I claim is—

1. The combination, with window, spindle extending through and journaled in the window frame or sash, and handle located inside the window and connected with the spindle for operating the same, of arm mounted on the spindle outside the window, said arm being adapted to sweep across the window-pane when actuated by the spindle, substantially as set forth.

2. The combination, with window, spindle, handle, and arm, substantially as indicated, of longitudinal recess on the inner face of such arm, a strip or pad, of rubber or other suitable material, seated in such recess, said pad being in position to engage the outer side of the window-pane, substantially as set forth.

3. The combination, with window, arm, spindle, and handle, substantially as indicated, of spring mounted on the spindle and located between the handle and window-frame, the tension of the spring tending to draw the spindle endwise and inward, so as to press the arm against the outside of the window-pane, substantially as set forth.

4. The combination, with window-frame, arm, and spindle, substantially as indicated, of handle mounted on the spindle, and spring located between the handle and window-frame, said handle being adjustable lengthwise of the spindle, whereby the tension of the spring may be regulated, substantially as set forth.

In testimony whereof I sign this specification, in the presence of two witnesses, this 26th day of November, 1887.

DAVID G. RICHARDS.

Witnesses:
CHAS. A. MCNAIRY,
H. J. MCNAIRY.